Figure 1A:
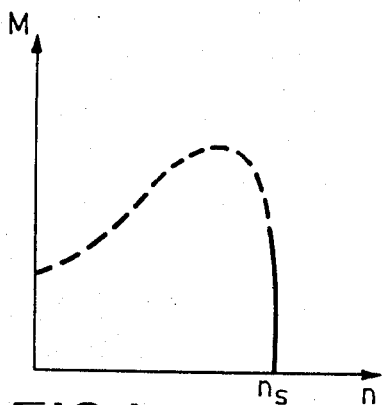
Figure 1B:
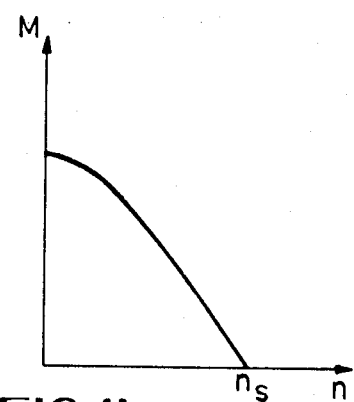

United States Patent
Jonsson

[15] 3,638,088
[45] Jan. 25, 1972

[54] A DEVICE FOR GENERATING A VARIABLE LOW-FREQUENCY AC CURRENT USING PULSE SAMPLING TECHNIQUES

[72] Inventor: Ragnar Georg Jonsson, Kallhall, Sweden
[73] Assignee: U.S. Philips Corporation, New York, N.Y.
[22] Filed: Sept. 13, 1968
[21] Appl. No.: 759,686

[30] Foreign Application Priority Data

Sept. 13, 1967 Sweden....................12652/67

[52] U.S. Cl. ........................................318/227, 318/231
[51] Int. Cl. ...................................................H02p 5/00
[58] Field of Search ..................318/227, 231; 321/65, 69, 66

[56] References Cited

UNITED STATES PATENTS

| | | | |
|---|---|---|---|
| 3,170,107 | 2/1965 | Jessee | 321/65 |
| 3,334,292 | 8/1967 | King et al. | 321/66 |
| 3,435,321 | 3/1969 | Brandt | 318/231 |
| 3,470,447 | 9/1969 | Gyugyi et al. | 321/69 |
| 3,320,506 | 5/1967 | Humphrey | 318/231 |
| 3,346,794 | 10/1967 | Stemmler | 321/9 A |
| 3,445,742 | 5/1969 | Moscardi | 321/9 A |
| 3,406,328 | 4/1966 | Studtmann | 321/9 A |

Primary Examiner—T. E. Lynch
Assistant Examiner—K. L. Crosson
Attorney—Frank R. Trifari

[57] ABSTRACT

A motor speed control system that features a low-frequency generator for producing a variable frequency output voltage that varies as a function of a control signal. Motor speed is adjusted by varying the frequency of the stator voltage. The low-frequency generator supplies the adjustable stator voltage by sampling an AC reference signal of a frequency that is higher than the desired stator voltage frequency. The sampling pulses are synchronized with the reference signal and the amplitude of the reference signal is variable as a function of the control signal, i.e., the output frequency.

12 Claims, 10 Drawing Figures

INVENTOR.
RAGNAR G. JONSSON
BY
AGENT

A DEVICE FOR GENERATING A VARIABLE LOW-FREQUENCY AC CURRENT USING PULSE SAMPLING TECHNIQUES

The present invention relates to a new generator for producing an output voltage of a new frequency which can vary down to zero frequency as a function of a control signal. The output voltage can be used for supplying an electric AC motor. It further relates to a servosystem including such a generator and an AC asynchronous motor used as a servomotor.

In order to generate signals of very low frequencies (e.g., lower than 10 p.p.s.) normal free oscillating oscillators cannot be used because the components used in these oscillators become too bulky.

A known method for low-frequency signal generation consists in sampling a reference signal of higher frequency. The filtered sampling signal forms a low-frequency copy of the reference signal. Its frequency corresponds to the frequency of the reference signal minus the frequency of the sampling pulses.

Difficulties, however, arise in the generation of the sampling pulses. These pulses must have a frequency which is close to the frequency of the reference signal. A drift in the frequency of the reference signal or the sampling pulses will produce a drift in the frequency of the output signal, which can be very unpleasant at low frequencies. One advantage of this method is that it is possible to obtain a polyphase output signal by sampling different phases of the reference signal.

Another known method for generating low-frequency signals is to utilize a voltage-frequency converter. In principle this functions such that an input voltage is integrated. When the output voltage of the integrator has reached a certain value it is zeroed and the integration repeated. Alternatively, a switch is used to change the integration direction so that integration takes place up and down between two fixed limits. By supplying a low input voltage to the integrator, very low frequencies can be generated. A drawback of this method is that the produced waveform is shaped as a sawtooth or triangular. This drawback can be eliminated by shaping the output signal in nonlinear networks. An advantage of this method is that the problems with frequency drift will not be so pronounced. The method is, however, not suitable for the generation of polyphase signals as it is not possible to lock the different phases to each other in a simple way.

The generator in accordance with the present invention utilizes both of the said principles for low-frequency generation, combining them in a new way which provides several advantages. It is characterized in that it comprises integrator means for integrating the control signal and cooperating with voltage sensitive switching means which change the integration direction at a certain level of the output voltage of the integrator means for producing a substantially triangular shaped wave, the slope of which varies with the control signal. The generator also includes a comparison device adapted to compare the varying triangular wave with a fixed triangular wave which has a fixed phase relationship to the reference signal thereby producing opening pulses for a gating means is supplied with a reference signal The output voltage is derived from the pulses obtained from the gating means.

The most important advantage of this generator is that an unintentional variation of the frequency of the reference signal, for example, due to frequency drift or other instability of the generator producing said reference signal, has no objectionable consequences since this same frequency is also used as a reference for the generation of the sampling pulses.

Another important advantage is that the frequency of the low frequency output voltage can be changed immediately by varying the control signal, since the circuit time constants are relatively short.

The low-frequency generator in accordance with the invention is very suitable for the production of polyphase signals, in which case the reference signal is preferably phase-shifted with the help of fixed phase shift networks. This operation is simplest with a sinusoidal waveform and the phase-order can then simply be determined by the sign of the control signal. In cases where the waveform is not sinusoidal, the sampling pulses can be delayed in time instead of phase-shifting the reference signal.

A low-frequency generator of the type specified hereinbefore and adapted to produce a polyphase output signal comprising several output voltages having a predetermined mutual phase relationship is characterized, according to the invention, by means for generating reference signals of the higher fixed frequency and with the required mutual phase relationship and gating means for each one of the phase displaced reference signals. The gating means are adapted to be opened simultaneously by pulses received from the said comparison device.

An AC asynchronous motor energized by a polyphase low-frequency generator can be used as a servomotor and thereby provide many advantages. Such AC motors can be used in all types of servosystems, as position servos, speed servos etc. They can also be used as normal driving motors for machines, either with a fixed or with an adjustable control signal.

Accordingly, the invention also includes a new servosystem including an AC asynchronous motor used as a servomotor and controlled by a control signal. This servosystem is characterized, according to the invention, in that the control signal is applied to a polyphase low-frequency generator of the type specified hereinbefore, and the outputs of which are connected to the different phases of the motor via power amplifiers.

The invention will now be described more fully with reference to the accompanying drawings illustrating the application thereof in a motor drive with an AC asynchronous motor adapted to be used in a servosystem, as a servomotor.

Figure 1C:
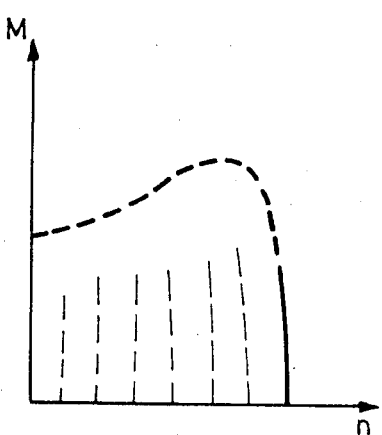
Figure 1D:
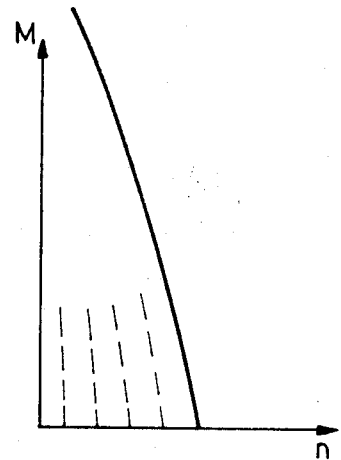
Figure 2:
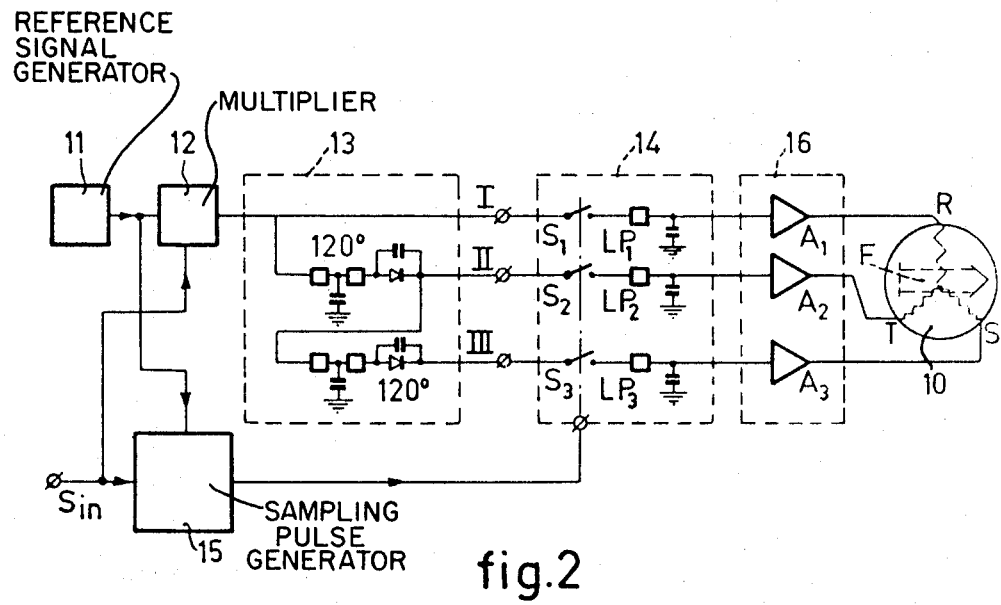
Figure 3:
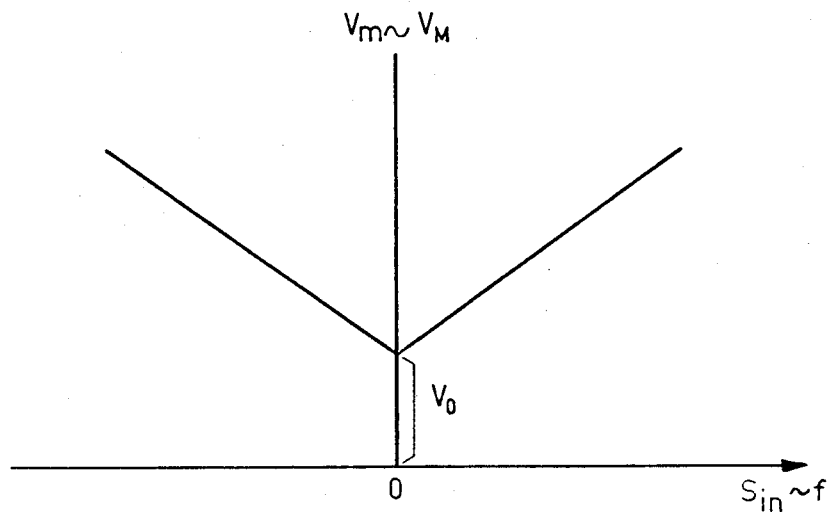
Figure 4:
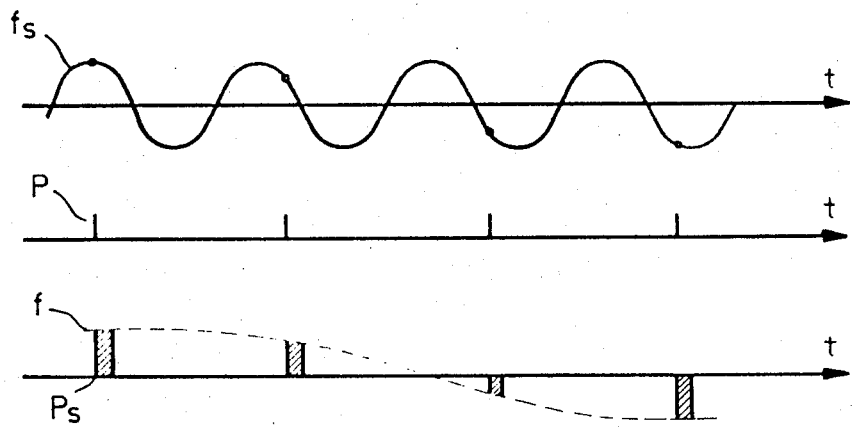
Figure 5:
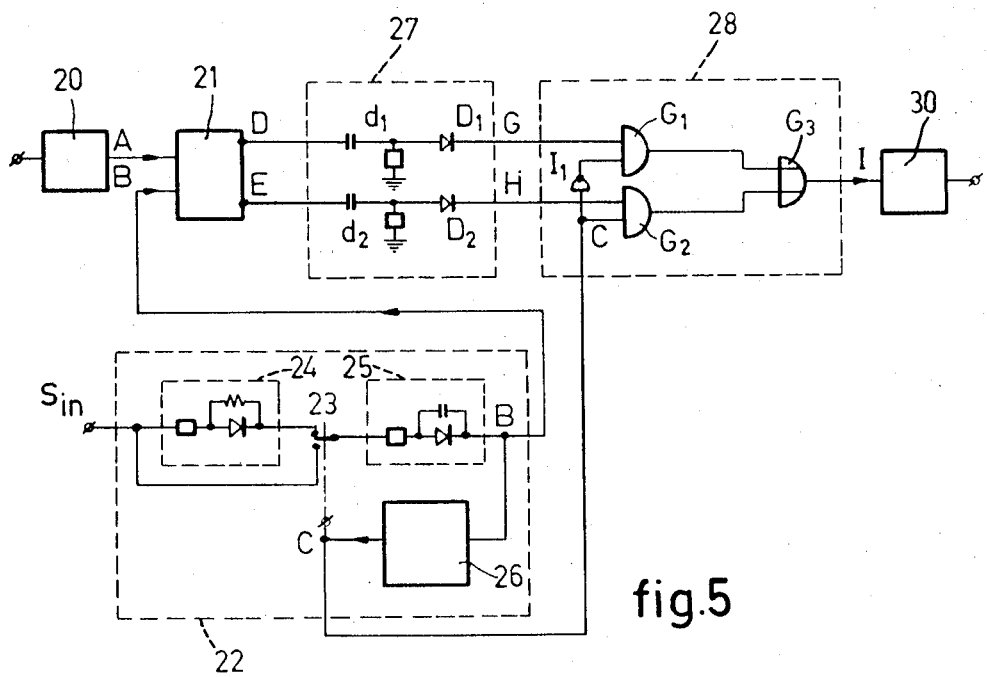
Figure 6:
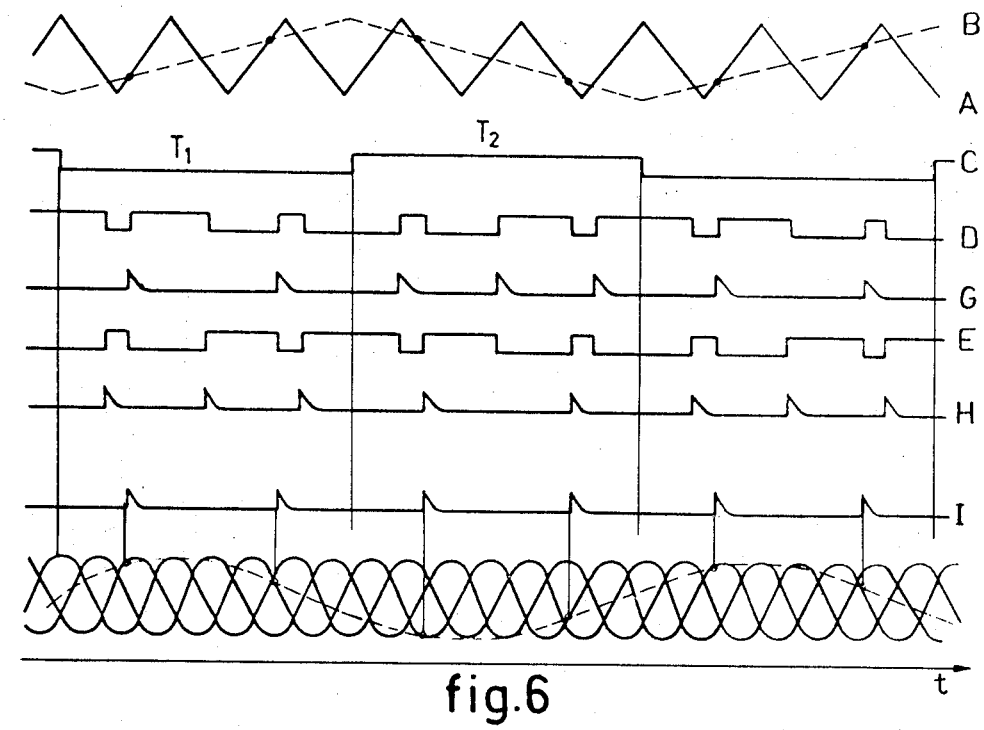
Figure 7:
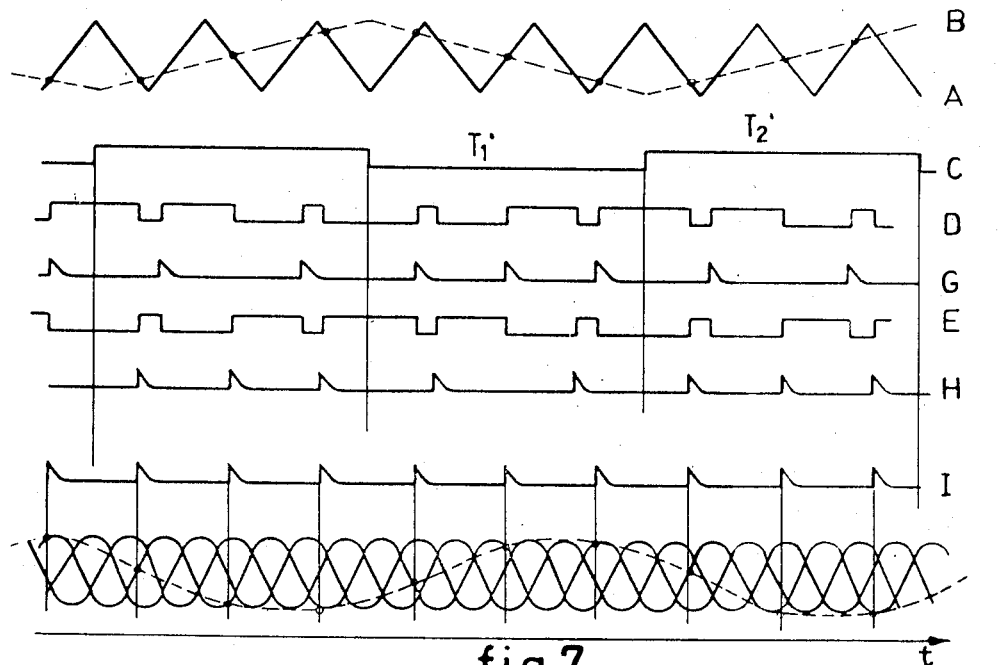

FIG. 1 shows some comparative curves of the torque as a function of the rotation speed for different motor types, FIG. 2 shows a circuit diagram, partly in block schematic form, of a device with a three-phase motor and a supply circuit for same, which makes it possible to use the motor as a servomotor, FIG. 3 shows a curve of the amplitude of the supply voltage as a function of the control signal for producing a constant magnetic field in the motor, FIG. 4 shows the principle for frequency conversion in dependence on the control signal with utilization of the known sampling technique, FIG. 5 shows a circuit diagram of a device adapted to produce sampling pulses, and FIGS. 6 and 7 show some time diagrams for explanation of the function of the circuit according to FIG. 5.

FIG. 1 shows the torque $M$ as a function of the rotation speed $n$ for a multiphase AC asynchronous motor, $n_s$ being the synchronous speed. The motor operates normally within the part of the curve which is drawn with full line, where the slip of the rotor is low. This will give a high efficiency since the efficiency is inversely proportional to the slip. In FIG. 1b is shown the corresponding characteristic for a multiphase AC asynchronous motor of the servo type. The torque curve has been deformed due to the fact that the resistance in the rotor winding has been increased. The torque rises linearly with the slip down to the rotation speed zero. The speed is regulated by varying the applied voltage. Such a motor, however, has a low efficiency as it usually operates with high slip.

According to the invention, an AC asynchronous motor with short-circuited rotor can be driven as a servomotor by maintaining a substantially constant field in the motor while the synchronous speed is varied in dependence on the control signal. Then a torque characteristic according to FIG. 1c is achieved in which the individual curves are valid for different synchronous speeds obtained by varying the supply frequency. When used as a servomotor it is important that the motor operates down to zero value of the control signal, where the motor shall produce zero torque, and that it changes rotation direction when the control signal changes polarity. The supply circuit described in the following fulfills these requirements. An AC motor driven according to the principles of the invention will have a high efficiency and a characteristic which is favorable for the regulation function. For comparison purposes FIG. 1d shows the torque characteristic for a DC motor, the individual curves being valid for different applied voltages.

In FIG. 2 there is shown a three-phase AC motor 10 with a supply circuit which makes it possible to drive the motor as a servomotor. The device shown in FIG. 2 is assumed to be included in a feedback regulation system, for example, a position servo or a tracking servo and the motor 10 then serves as the effectuating means in the regulation circuit. The motor is assumed to operate on a control signal $s_{in}$, which signal represents the error in the system and is to be regulated to zero.

The circuit obtains driving voltage from a signal generator 11, which delivers a sinusoidal output voltage of a fixed frequency, for example, 400 c.p.s. For reasons described in the following, the output voltage of the signal generator is multiplied with the control signal $s_{in}$ in a multiplier 12 so that the multiplier supplies an output voltage which increases linearly with $s_{in}$, however, not from a zero value but from a certain initial value at $s_{in}=0$. The output voltage of the multiplier is led to a phase shift unit 13 comprising two phase rotating networks, which at the particular fixed frequency, for example, 400 c.p.s. will each produce a phase rotation of 120°. Thus at the output terminals I, II, III of the phase shift unit three-phase displaced voltages having the typical phase displacements for three-phase operation are obtained. In a frequency converter 14 the frequency is then converted to a value determined by the control signal $s_{in}$. This is effected by means of electronic switches $s_1$, $s_2$, $s_3$ which are controlled by pulses from a sampling pulse generator 15. For each pulse from generator 15, the switches $s_1$, $s_2$ and $s_3$ are closed for a short moment whereby the instantaneous value of the respective sinusoidal reference voltage is passed to the following filter circuits $LP_1$—$LP_3$ the sampling pulse generator is in turn controlled by the control signal $s_{in}$ and derives its reference voltage from the signal generator 11. The sampling pulses produced by the sampling pulse generator 15 are controlled so that their frequency deviates by a small value from the reference frequency produced by the signal generator 11, the magnitude of the said deviation being proportional to the control signal $s_{in}$. After filtering in low pass filters LP1, LP2, LP3, sinusoidal AC voltages are obtained which are still mutually 120° phase displaced. However, the frequency of these voltages are low in comparison to the frequency of the reference voltage or the sampling pulses. In fact, the frequency of said AC voltages corresponds only to the difference between the reference frequency obtained from the signal generator and the sampling frequency. The said difference between the reference frequency and the sampling frequency is, however, according to the foregoing, proportional to the control signal, whereby the frequency of the voltages from the frequency conversion and filtering unit 14 will be proportional to the value of the control signal $s_{in}$. The voltages from the unit 14 are amplified by means of linear amplifiers A1, A2, A3 which are included in an amplifier unit 16 and the operation range of which extends down to zero frequency. The amplified voltages are finally fed to the stator windings R, S, T of the motor 10.

The mutually 120° phase displaced supply voltages will produce a magnetic field F in the motor which rotates with a speed determined by the supply frequency. In the present case the supply frequency is variable and varies with the control signal down to zero frequency at the zero value of the control signal. The said multiplier 12 is then arranged in order to ensure that the magnitude of the field does not change with frequency due to the reactive impedance of the stator windings. The amplitude of the output voltage $V_m$ of the multiplier as a function of the control signal $s_{in}$ is shown in FIG. 3. The curve according to FIG. 3 also represents the supply voltage V of the motor as a function of the supply frequency $f$ because the said voltage is proportional to the output voltage of the multiplier and the frequency varies linearly with the control signal. The supply voltage $V_0$ at zero value of the control signal, i.e., at the frequency zero, is selected such that it is able to overcome the resistance of the stator windings of the motor and produce full magnetic field in the motor. Due to the fact that both the supply voltage and the reactive impedance of the windings will increase linearly with the frequency, this field will then be maintained constant independently of the magnitude of the control signal and thereby the magnitude of the frequency. Only the rotation speed of the field will vary with the control signal $s_{in}$.

FIG. 4 shows the principle for obtaining frequency conversion by sampling. The curve $f_s$ is the sinusoidal reference voltage produced by the signal generator. The pulses $p$ are the sampling pulses from the sampling pulse generator. In the example shown, the pulses represent a frequency which is somewhat lower than the reference frequency $f_s$. This is assumed to correspond to a positive value of the control signal. The pulses $p_s$ obtained by the sampling operation are shown below in FIG. 4. After filtering these pulses will give a sinusoidal voltage $f$ having a frequency equal to the difference between the sampling frequency and the reference frequency obtained from the signal generator. At zero value of the signal voltage (Sin) the sampling frequency is equal to the frequency of the signal generator so that after filtering, a constant voltage is obtained representing the frequency zero. At reversed polarity of the control signal the sampling frequency will be higher than the frequency of the signal generator.

Due to the fact that all three-phase voltages, which are mutually 120° phase displaced, are sampled simultaneously, voltages will be produced after the frequency conversion, which are in the same way exactly 120° phase displaced independently of the frequency. It is also easy to show that the described frequency conversion by simultaneous sampling of all three-phase voltages in a three-phase system will automatically result in reversion of the phase order, when the deviation between the sampling frequency and the reference frequency changes sign. Thus, if a positive control signal corresponds to the phase order RST, a negative signal voltage will result in the phase order RTS. As a consequence of this there will always be a magnetic field F of constant magnitude in the motor, which field at zero value of the control signal is standing still and at signals different from zero will rotate in the one or the other direction with a speed determined by the control signal.

In FIG. 5 there is shown a suitable embodiment of the sampling pulse generator 15. The generator is described in connection with FIGS. 6 and 7, wherein FIG. 6 is valid for a positive control signal and FIG. 7 for a negative control signal. The reference voltage for the pulse generator is a triangular wave A which is synchronous with the sinusoidal reference wave. The triangular wave is produced by means of a device 20 connected to the signal generator 11 in FIG. 1. The triangular wave A is shown at the top of FIGS. 6 and 7 and is applied to one input of a comparison device 21. The control signal $s_{in}$ is applied to a circuit 22 which converts the signal to a triangular wave of constant amplitude but variable frequency (lower than the frequency of wave A). The circuit 22 consists of an electronic switch 23 to which the control signal is applied on the one hand directly and on the other hand through a sign converter (inverter) 24. This, depending upon the position of the switch, the control signal or its inverted value is applied to an integrator 25. A measuring device 26 is sensitive to the output voltage of the integrator and operates the switch 23 at a certain value $\pm V_1$ of the said voltage. For example, if the control signal is positive the integrator will produce a voltage with positive derivata for the illustrated position of the switch. If the signal had been negative the integrator would have produced an output voltage with negative derivata. When the output voltage of the integrator reaches the value $+V$, the measuring device 26 will react and cause the switch 23 to assume the opposite position. Then the integrator will receive an input signal with reversed polarity and will start to integrate in the opposite direction. When the output voltage of the integrator reaches $-V_1$ the switch will be brought back to the initial position and the integrator will again produce a voltage with positive derivata.

The output voltage B of the integrator, shown in the same time diagram as the voltage A at the top of FIGS. 6 and 7, is applied to a second input terminal of the comparison device 21. The voltage limits of the measuring device 26 are selected so that the output voltage from the integrator varies between the same limit values as the triangular wave from the device 20.

The circuit 22 can apparently operate in two different modes. For a positive control signal the integrator will operate in a certain direction for a predetermined position of the switch 23. For a negative control signal the integrator will operate in opposite direction with the same position of the switch. As indicative of the position of the switch 23, the control signal C which actuates same can be used. This control signal is shown in the next time diagram in FIGS. 6 and 7. Thus there will be a different mutual phase relationship between the waveform B and C depending upon the polarity of the control signal $S_{in}$. For a positive control signal, as shown in FIG. 6, an increasing voltage from the integrator is obtained at zero value of the control signal to the switch (interval T1) and decreasing voltage at positive value of the control voltage to the switch (interval T2). For a negative control signal as shown in FIG. 7, a decreasing voltage is obtained from the integrator at zero value of the control voltage to the switch (interval T1') and increasing voltage from the integrator at positive value of the control voltage to the switch (interval T2').

The sampling pulses are produced by selecting suitable coincidence points between the invariable reference triangular wave A and the controllable triangular wave B which varies with the control signal. According to our assumption a positive control signal shall correspond to a somewhat lower sampling frequency than the reference frequency. This means that sampling pulses are to be generated at such coincidence points where both triangular waves have the same sign of the derivata. Sampling pulses shall thus according to FIG. 6 be produced at the points marked by rings in the Figure, which will result in a somewhat longer time period than the period of the reference frequency and thus a somewhat lower frequency.

The sampling pulses are generated by means of the said comparison device 21 with following pulse shaping unit 27 and logic unit 28. The unit 28 also receives the waveform C. The comparison device 21, to which the two waveforms A and B are applied, produces at an upper output terminal a voltage D which is positive as long as A is larger than B and zero when A is smaller than B. In the pulse shaping device 27 the rectangular wave D is first differentiated in a differentiation circuit $d_1$, whereafter the produced pulses are led through a diode $D_1$. The diode $D_1$ only passes the positive pulses corresponding to the front flanks of the rectangular wave D from the comparison device. These pulses from a pulse series G. On a second output terminal the comparison device delivers a voltage E, which is positive when A is smaller than B and zero when A is larger than B. This voltage is in a similar way first differentiated in a differentiation circuit $d_2$, whereafter the negative pulses are blocked by a diode $D_2$ so that only the positive pulses are passed. These pulses form a pulse series H. The pulse series G and H are applied to AND-gates $G_1$ and $G_2$, respectively, included in the logic unit 28. The waveform C is applied to a second input of the AND gates. The gate $G_1$ receives the voltage C via an inverter $I_1$. The AND gates will pass the pulse series G or H only if a positive voltage is present at the second input of the respective gate. The pulses passed by the gates are added in an OR-gate $G_3$. The output pulses of gate $G_3$ form a pulse series I that is applied to a pulse oscillator 30. For each triggering pulse from the OR-gate $G_3$ the oscillator will produce an output pulse of a predetermined length, which is supplied to the sampling switches via the output terminal.

If now we first take FIG. 6 into consideration which corresponds to a positive control signal, the gate $G_1$ is open and the gate $G_2$ closed during the interval $T_1$. Thus, during $T_1$ the pulse series G is passed to the OR-gate $G_3$. During interval $T_2$ the gate $G_2$ is open and $G_1$ closed, whereby the pulse series H is passed to the OR-gate $G_3$. This will give a resulting pulse series I from the OR-gate $G_3$ as shown in FIG. 6. The pulses in the pulse series I correspond, as shown, to the required coincidence points which will give a somewhat longer period and thus a lower frequency than the reference frequency. At the bottom of FIG. 6 the three-phase voltages are shown which are sampled by means of the pulses of the pulse series I. The sampling points are indicated on one of the phase voltages only.

In order to obtain a higher frequency of the sampling pulses than the reference frequency, sampling pulses will be generated at the coincidence points between triangular waves A and B where the two curves have different sign of the derivata. These points are marked by rings in FIG. 7. Correct coincidence points are selected in the logic unit by means of the voltage C in the same way as previously described. During the interval T1' gate $G_1$ is open, whereby the pulse series G is supplied to the OR-gate $G_3$. During the interval T2' gate $G_2$ is open and passes the pulse series H to the OR-gate $G_3$. Thus a resulting pulse series I as shown in FIG. 7 is obtained, which corresponds to the required coincidence moments.

As long as the integrator 25 is ideal, the slope of the waveform B will proportional to the control signal and the deviation of the sampling pulse frequency from the carrier frequency will vary proportionally with the control signal. Therefore the supply also frequency of the motor obtained after the frequency conversion also will vary proportionally with the control signal.

Instead of using a signal generator with a fixed frequency and common sampling of all phase voltages in dependence upon a control signal for producing the supply voltages to the motor, it is also possible in principle to utilize other methods for producing the supply voltages. For example, in digital systems it is possible to buildup the sinusoidal-shaped AC voltages by means of a device for generating a stair shaped curve approximating the sinusoidal wave. Such a device can be programmed to produce the required phase differences between the different voltages. The stair shaped curve can have a fixed or varying distance between the steps, also a fixed or varying height of the steps. Alternatively a sinusoidal wave can be approximated by means of a number of straight lines of varying slope. Each waveform is then produced by an integrator which is actuated at certain moments, i.e., at so-called "break" points, for changing the integration speed or direction. If the break points are selected so that each such line comprises 60° of the sine wave, the control circuits of the different integrators can easily be switched such that a multiphase system is achieved. The control signal shall in a suitable way control the integrators so that the required relationship between the control signal and the frequency and amplitude of the AC voltage is obtained. The method of maintaining a substantially constant magnetic field in the motor so that the synchronous speed is varied only by a frequency regulation in dependence upon a control signal is not limited to three-phase motors but can be applied to any AC motor having a rotating magnetic field, for example, two-phase motors.

Many modifications of the described arrangements are possible. For instance, the produced polyphase low-frequency signal can be used to drive final stages of any suitable type, such as linear amplifiers or pulse width modulated amplifiers, for example, thyristors which are open during a certain phase angle of the supply frequency.

According to another method of polyphase generation, which can bring about a simplification of the circuits, a two-phase signal with a mutual phase difference of 90° between the two output voltages is first formed, and any required polyphase signal, for example, a three phase signal is then formed by adding different fractions of these two output voltages in accordance with the well-known trigonometric rules.

What is claimed is:

1. A supply system for an AC motor including a low-frequency generator for producing, as a function of a control signal, a variable frequency output voltage the frequency of which is variable down to zero frequency, said system comprising, a source of reference signal of a frequency that is higher than the frequency of the output voltage, comparison means having first and second inputs, means for supplying to said first input a fixed triangular wave voltage having a fixed phase relationship to the reference signal, integrating means for integrating the control signal, voltage-sensitive switching means coupling said control signal to the input of the integrating means and responsive to the output voltage of the integrating means to change the integration direction at a given level of the output voltage of the integrating means so as to produce a substantially triangular wave voltage the slope of which varies as a function of the control signal, means for coupling the latter triangular wave voltage to the second input of the comparison means, gating means coupled to said source of reference signal and to the output of the comparison means whereby said reference signal is sampled upon coincidence of the two triangular wave voltages at the first and second inputs thereby to produce voltage pulses at the output of the gating means, for deriving the system output voltage from the pulses at the output of the gating means.

2. A supply system as claimed in claim 1 including means for producing a polyphase output voltage having a predetermined mutual phase relationship between the different phases, said polyphase voltage producing means comprising, means for generating one or more additional reference signals of said higher frequency and with the required mutual phase relationship, and gating means for each of said reference signals and coupled to the comparison means so as to be opened simultaneously by pulses received therefrom.

3. A motor speed control system adapted to produce an output voltage whose frequency can be varied as a function of a control signal comprising, a source of control signal which is variable to supply positive and negative polarity signals, a source of reference signal of a given frequency, means synchronized with said reference signal and coupled to said control signal source for producing sampling pulses that vary in frequency as a function of the control signal, said pulse producing means including means responsive to the polarity of the control signal to generate pulses at frequencies that are higher than said given reference frequency for one polarity of the control signal and at frequencies that are lower than said given reference frequency for the opposite polarity of the control signal, gating means, circuit means interconnecting said gating means with the output of the reference signal source and with said sampling pulses whereby the gating means passes a series of voltage pulses, and means responsive to said voltage pulses for deriving the variable frequency output voltage.

4. A motor speed control system adapted to produce an output voltage whose frequency can be varied as a function of a control signal comprising, source of control signal, a source of reference signal of a given frequency, means synchronized with said reference signal and coupled to said control signal source for producing sampling pulses that vary in frequency as a function of the control signal, gating means, circuit means interconnecting said gating means with the output of the reference signal source and with said sampling pulses whereby the gating means passes a series of voltage pulses, said circuit means including means for combining said reference signal with said control signal so that the amplitude of the reference signal coupled to said gating means varies as a function of the control signal, and means responsive to said voltage pulses for deriving the variable frequency output voltage.

5. A motor speed control system adapted to produce an output voltage whose frequency can be varied as a function of a control signal comprising, a source of control signal which can be varied to supply positive and negative polarity signals, a source of reference signal of a given frequency, means synchronized with said reference signal and coupled to said control signal source for producing sampling pulses that vary in frequency as a function of the control signal, gating means, circuit means interconnecting said gating means with the output of the reference signal source and with said sampling pulses whereby the gating means passes a series of voltage pulses, said circuit means including phase shift means coupled to said reference signal source so as to produce at its output a polyphase reference signal, said gating means including an individual gate circuit for each phase of the polyphase reference signal, said sampling pulses being coupled to said gating means so as to simultaneously open the gate circuits for each phase of the polyphase signal thereby to produce a polyphase output voltage, means responsive to said voltage pulses for deriving the variable frequency output voltage, and said pulse producing means includes means responsive to the polarity of the control signal to generate pulses at frequencies that are higher than said given reference frequency for one polarity of the control signal and at frequencies that are lower than said given reference frequency for the opposite polarity of the control signal whereby the direction of phase rotation of the polyphase output voltage is determined by the polarity of the control signal.

6. A system as claimed in claim 5 wherein said reference signal is a sinusoidal signal and said output voltage deriving means comprises a filter which supplies an output voltage having a frequency that is equal to the difference between the reference signal frequency and the sampling pulse frequency.

7. A system as claimed in claim 6 further comprising an AC asynchronous motor having a plurality of stator windings individually coupled to respective phases of the polyphase output voltage so as to produce a rotating field in the motor.

8. A motor speed control system adapted to produce an output voltage whose frequency can be varied as a function of a control signal comprising, a source of control signal, a source of reference signal of a given frequency, means synchronized with said reference signal and coupled to said control signal source for producing sampling pulses that vary in frequency as a function of the control signal, gating means, circuit means interconnecting said gating means with the output of the reference signal source and with said sampling pulses whereby the gating means passes a series of voltage pulses, means responsive to said voltage pulses for deriving the variable frequency output voltage, and wherein said pulse producing means comprises, means coupled to said reference signal source for generating a first triangular voltage wave at the reference signal frequency, means responsive to the control signal for generating a second fixed amplitude triangular voltage wave having a frequency that varies with the control signal, and means for comparing said first and second triangular voltage waves to produce sampling pulses at given coincidence points between said voltage waves.

9. A system as claimed in claim 8 wherein said means for generating the second triangular voltage wave comprises, integrator means coupled to the control signal for integrating same, voltage sensitive means connected to the output of the integrator means for reversing the direction of integration whenever the voltage at the output of the integrator means reaches a given voltage level, and means for coupling the triangular voltage wave produced at the output of the integrator means to an input of the comparing means.

10. A motor speed control system for producing a variable frequency output voltage comprising, a reference source of AC voltage of a frequency $f_1$, a source of control voltage, means jointly controlled by said reference voltage and said control voltage for generating sampling voltage pulses in a frequency range $f_1$ through $f_2$ that is determined by the value of the control voltage, frequency converter means coupled to said reference voltage source and to said pulse generating means whereby said reference voltage is sampled at a frequency in the range $f_1$ through $f_2$ determined by the control voltage to produce an AC output voltage having a frequency $f_3$ that is the difference frequency between the reference frequency $f_1$ and the sampling pulse frequency, said output voltage frequency being variable as a function of the control voltage, voltage multiplier means interconnected between said reference voltage source and said frequency converter means, and means for coupling said control voltage to an input of the multiplier means so that the multiplier means supplies to the frequency converter means an AC voltage of frequency $f_1$ that linearly varies in amplitude as a function of the control voltage.

11. A system as claimed in claim 10 wherein said frequency converter means includes gating means for producing amplitude modulated voltage pulses at the sampling pulse frequency and filtering means for filtering said modulated pulses to produce said AC output voltage of variable difference frequency.

12. A system as claimed in claim 11 further comprising phase shifting means interconnected between said multiplier means and said frequency converter means so as to derive a polyphase AC reference voltage, said frequency converter gating means comprising an individual gating device for each phase of the polyphase reference voltage, said sampling pulses being coupled to said gating means so as to simultaneously open each of the gating devices thereby to derive a polyphase AC output voltage.

* * * * *

UNITED STATES PATENT OFFICE
CERTIFICATE OF CORRECTION

Patent No. 3,638,088         Dated January 25, 1972

Inventor(s) RAGNAR GEORG JONSSON

It is certified that error appears in the above-identified patent and that said Letters Patent are hereby corrected as shown below:

Column 7, claim 1, line 24, before "for" insert -- and means --;

Signed and sealed this 15th day August 19 72.

(SEAL)
Attest;

EDWARD M. FLETCHER, JR.
Attesting Officer

ROBERT GOTTSCHALK
Commissioner of Patents